Oct. 20, 1970    J. S. CONNORS    3,535,679
SAFETY SIGNAL MECHANISM FOR A TRACTOR SEMI-TRAILER
FIFTH WHEEL CONNECTOR
Filed Oct. 5, 1967    4 Sheets-Sheet 1
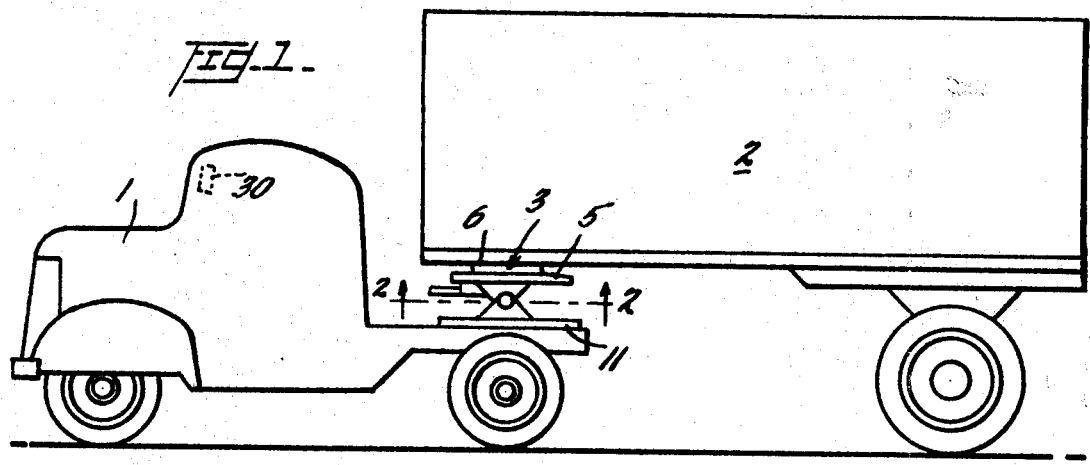
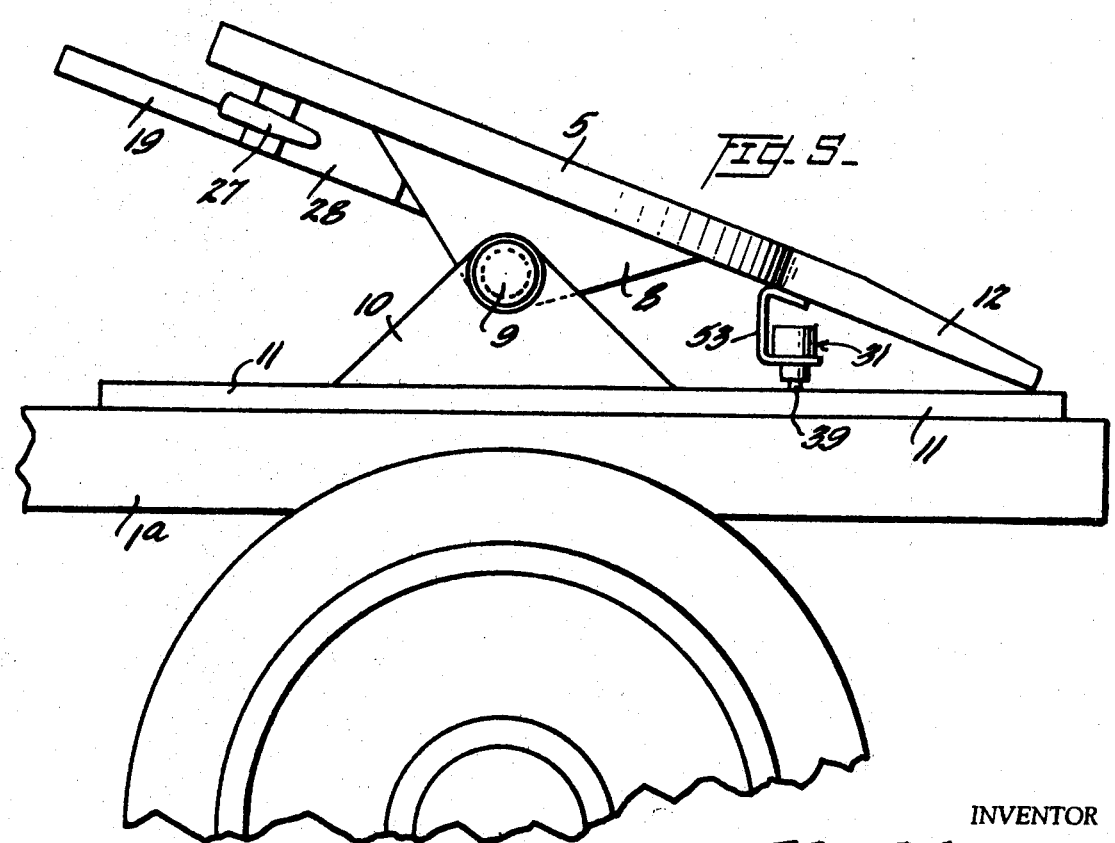
INVENTOR
John S. Connors,
BY Chas. H. Trotter
ATTORNEY Oct. 20, 1970  J. S. CONNORS  3,535,679
SAFETY SIGNAL MECHANISM FOR A TRACTOR SEMI-TRAILER
FIFTH WHEEL CONNECTOR
Filed Oct. 5, 1967  4 Sheets-Sheet 2

INVENTOR
John S. Connors,

BY Chas. H. Trotter
ATTORNEY

Oct. 20, 1970 J. S. CONNORS 3,535,679
SAFETY SIGNAL MECHANISM FOR A TRACTOR SEMI-TRAILER
FIFTH WHEEL CONNECTOR
Filed Oct. 5, 1967 4 Sheets-Sheet 3

INVENTOR
John S. Connors,

BY Chas. H. Trotter

ATTORNEY

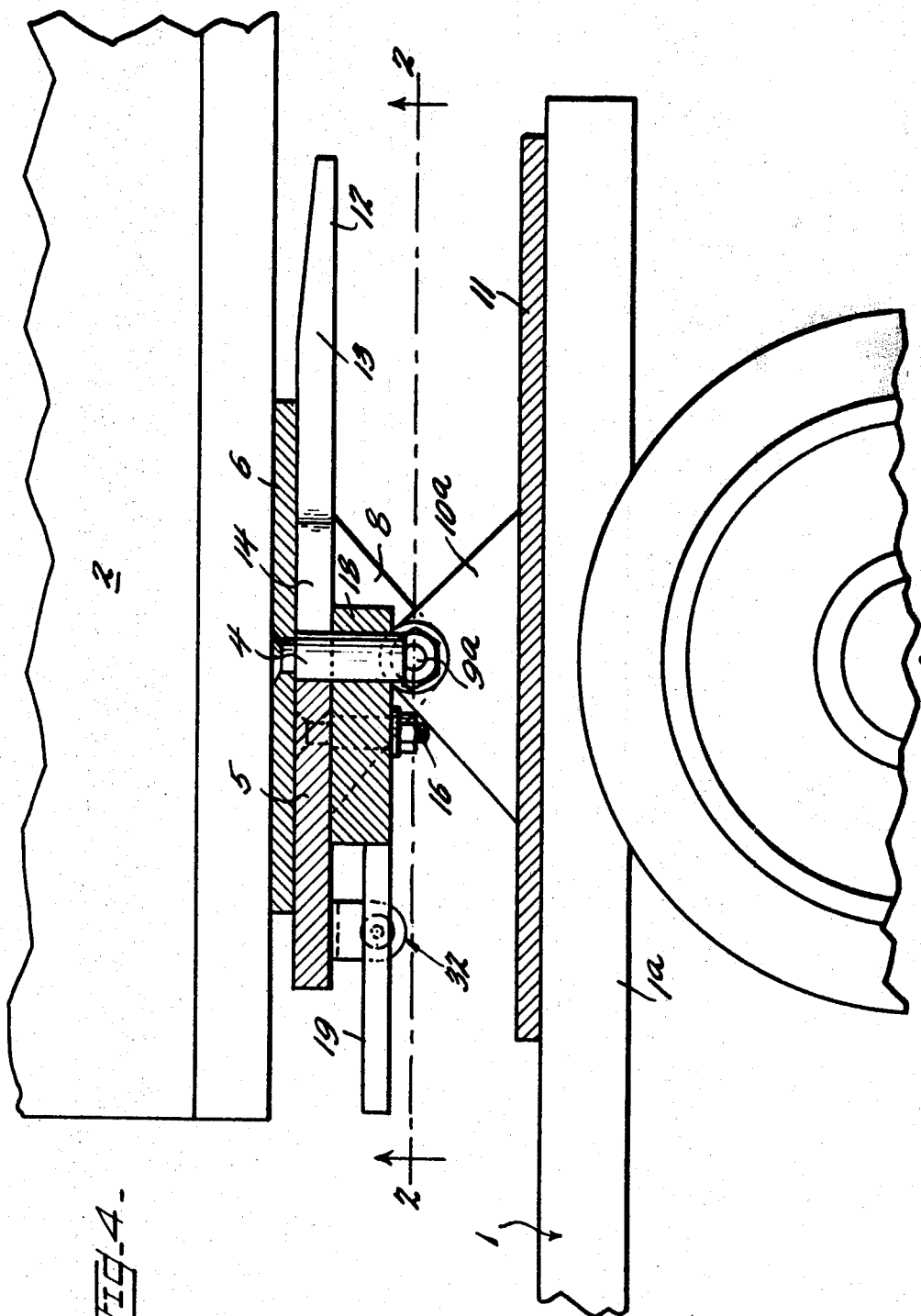

United States Patent Office 3,535,679
Patented Oct. 20, 1970

3,535,679
SAFETY SIGNAL MECHANISM FOR A TRACTOR SEMI-TRAILER FIFTH WHEEL CONNECTOR
John S. Connors, 1476 E. 367th St.,
Eastlake, Ohio 44094
Filed Oct. 5, 1967, Ser. No. 673,167
Int. Cl. G08b 7/00, 19/00
U.S. Cl. 340—52                                  4 Claims

ABSTRACT OF THE DISCLOSURE

In a tractor semi-trailer combination having a fifth wheel connecting means, an electrically operated signalling device located in the cab of said tractor, a pair of similar switches which are yieldingly biased to closed position and are mounted on the fifth wheel of the said connecting means, and an electrical circuit, the said signalling device and said switches being disposed in said circuit in series with each other, said switches being operative when both are closed to energize said signalling device, and to de-energize said signalling device when either one thereof is open.

---

This invention relates to a safety signal mechanism for the fifth wheel connection between a tractor and a semi-trailer.

Fifth wheel connections between a tractor and a semi-trailer comprise generally a fifth wheel which is mounted on the rear end of the tractor, and a bearing plate and a downwardly extending king pin which are secured to the under side of the semi-trailer adjacent the forward end thereof. The fifth wheel, which is mounted on the tractor for tilting movement about a transverse horizontal axis, is provided with a V-shaped slot which extends rearwardly from an axially disposed vertical aperture therein to the periphery thereof. When the tractor and semi-trailer are uncoupled the fifth wheel is inclined downwardly and rearwardly about the transverse horizontal axis thereof, and the forward end of the semi-trailer is supported by a frame which is retractably connected to the under side of the semi-trailer and extends downwardly therefrom rearwardly of the bearing plate and king pin thereof. As the rear end of the tractor is backed under the forward end of the semi-trailer in coupling them together the king pin is engaged by the V-shaped slot in the fifth wheel and guided into the axial aperture therein; and the upper surface of the inclined fifth wheel engages the bearing plate on the semi-trailer thereby raising the forward end of the semi-trailer as the fifth wheel assumes a horizontal position during the rearward movement of the tractor. As the king pin enters the central aperture in the fifth wheel it engages and actuates a locking mechanism, which is mounted on the under side of the fifth wheel, and by which the king pin is securely locked to the fifth wheel. As the locking mechanism approaches locking position it actuates a latching mechanism which is operative to maintain the locking mechanism in locking position until it is manually released. The semi-trailer is thereby towed by the tractor through the fifth wheel and king pin connection therebetween.

Before starting the tractor forward, after coupling, it is essential that the tractor operator know that the semi-trailer king pin has been securely locked to the tractor fifth wheel, as otherwise the tractor may move out from under the trailer thereby dropping the forward end of the trailer which may result in serious damage to both the trailer and the cargo therein.

There are many cases on record where the locking mechanism between the fifth wheel and the king pin has become unlocked, due to failure of the latching mechanism or other causes, during transit, thereby releasing the connection between the tractor and trailer, resulting in a total loss of the trailer and cargo therein, and sometimes causing serious accidents to others on the road, all of which might have been prevented had the tractor operator had warning of such failure.

It is therefore the principal object of this invention to provide a safety signal mechanism, which is applied to the fifth wheel connection between a tractor and a semi-trailer, and is operative to indicate to the tractor operator, during coupling of the tractor and trailer, that the king pin of the trailer has been locked to the fifth wheel of the tractor, and during transit, to warn him of any impending release thereof.

Another object of the invention is to provide a safety signal mechanism of the aforesaid character which is of simple construction and is very effective in operation.

Another object of the invention is to provide a safety signal mechanism of the aforesaid character which can be readily applied to any tractor semi-trailer connection of the fifth wheel type.

The safety signal mechanism of the invention, which is operative to indicate to the tractor operator during coupling of the tractor to the semi-trailer that the king pin of the semi-trailer has been locked to the fifth wheel, and during transit to warn the operator of any impending release of the king pin from the fifth wheel, comprises generally an electrically operated signalling device and a pair of similar switches which are yieldingly biased to closed position, and an electric circuit in which the signalling device and the pair of switches are all interposed in series with each other. The signalling device, which may give either an audible or a visual signal or both, is mounted in the cab of the tractor in position to be heard and seen by the operator. One of the switches is secured to the underside of the fifth wheel in position to be maintained open by the engagement thereof with the tractor chassis when the fifth wheel is in its normal rearwardly and downwardly inclined position when the tractor is uncoupled from the semi-trailer. The other of the switches is secured to the underside of the fifth wheel in position to be engaged by and maintained opened by the locking mechanism when the locking mechanism is latched in king pin locking position. Therefore when the tractor is uncoupled from the semi-trailer the one switch is maintained open and the other switch is spring pressed to closed position.

In coupling the tractor to the semi-trailer the tractor is backed up under the forward end of the semi-trailer in position for the semi-trailer king pin to enter the slot in the fifth wheel. As the king pin is entering the slot the semi-trailer engages the fifth wheel and rocks it from its inclined position to horizontal position and raises the one switch up out of engagement with the tractor chassis thereby permitting it to be spring pressed to closed position which closes the circuit to and energizes the signalling device which then starts emitting its signal which indicates to the tractor operator that the king pin is entering the fifth wheel slot. As the king pin approaches the inner end of the slot it engages the locking device and moves it into locking engagement therewith and into engagement with the other switch which effects the opening thereof, thereby breaking the circuit to and de-energizing the signalling device. The signalling device being de-energized stops emitting its signal, thereby indicating to the tractor operator that the tractor has been properly coupled to and locked to the semi-trailer. If during transit the locking mechanism starts to move out of contact with the other switch for any reason, the other switch will then be spring pressed to closed position which will close the circuit to the signalling device and cause it to emit its signal thereby warning the tractor operator that the tractor may be coming uncoupled from the semi-trailer in time for the operator to stop the tractor before it drops the semi-trailer.

Having stated the principal objects of the invention other and more specific objects thereof will be apparent from the following specification and the accompanying drawings forming a part thereof in which:

FIG. 1 is a side elevation of a tractor showing it connected to a semi-trailer by a fifth wheel connecting means having the safety signal mechanism of the invention incorporated therein;

FIG. 4 is a vertical sectional view through the fifth wheel connecting means between the tractor and the semi-trailer, the plane of the section being indicated by the line 4—4 on FIG. 2;

FIG. 5 is a side elevation of the rear end of the tractor showing the fifth wheel carried thereby in the position it normally assumes by gravity when the tractor is uncoupled from the semi-trailer;

Figure 2:
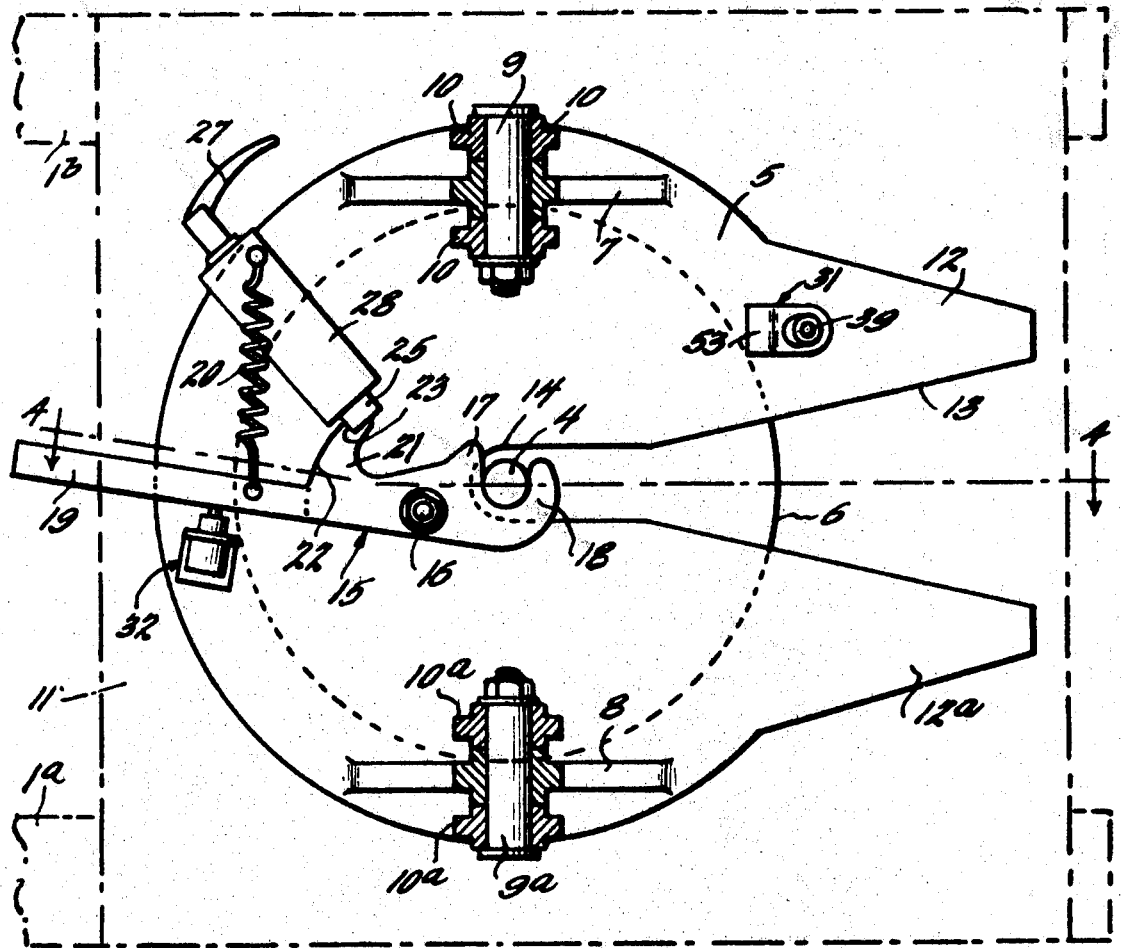
FIG. 2 is an enlarged section, taken on the line 2—2 on FIGS. 1 and 4 showing the king pin carried by the semi-trailer locked to the fifth wheel mounted on the tractor.
Figure 6:
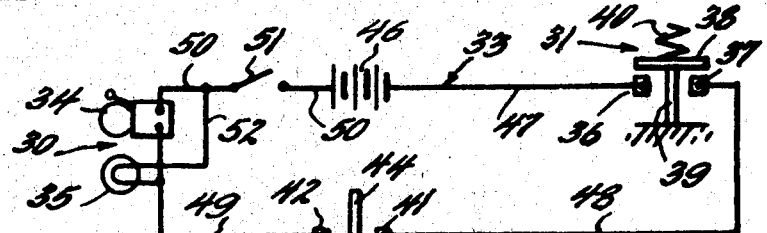
FIG. 6 is a wiring diagram of the safety signal mechanism showing the relative condition of the two switches thereof when the tractor and semi-trailer are uncoupled as shown in FIG. 5.
Figure 7:
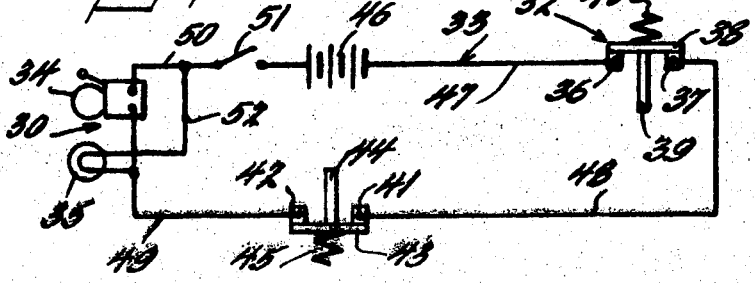
Figure 3:
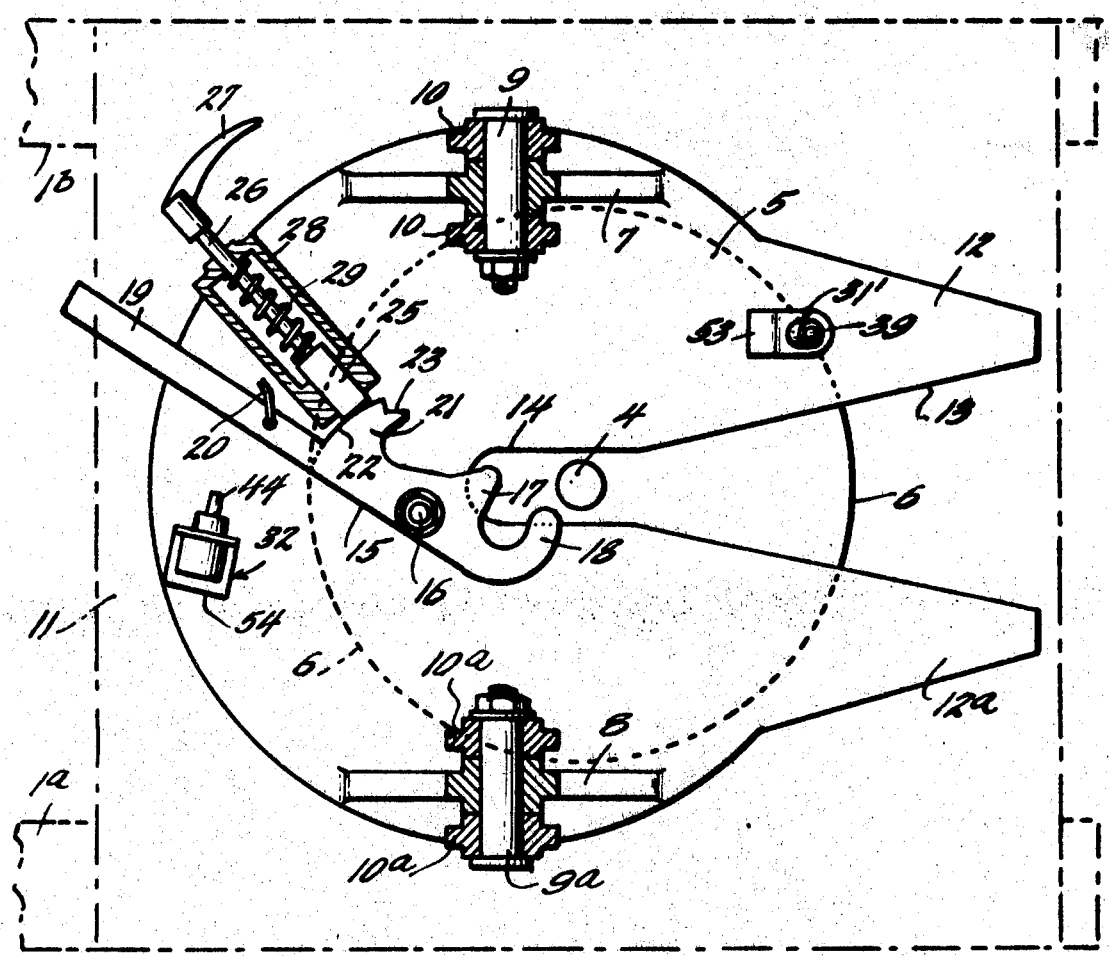
FIG. 3 is a view similar to FIG. 2 showing the fifth wheel and locking mechanism carried thereby approaching the semi-trailer king pin as the tractor is backed up under the forward end of the semi-trailer during the coupling of the tractor to the semi-trailer.
Figure 8:
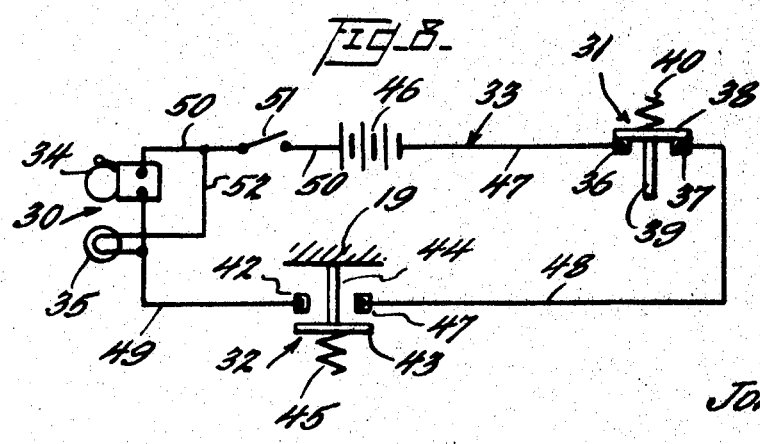

FIG. 7 is a view similar to FIG. 6 showing the relative condition of the two switches during coupling of the tractor to the semi-trailer as shown in FIG. 3; and FIG. 8 is a view similar to FIGS. 6 and 7 showing the relative condition of the two switches with respect to each other when the tractor and semi-trailer are coupled together with the semi-trailer king pin securely locking to the tractor fifth wheel as shown in FIGS. 2 and 4.

Having generally described the construction and operation of the invention it will now be specifically described in connection with the drawings by the use of reference characters in which the numeral 1 indicates a tractor which is releasably connected to a semi-trailer 2 by a conventional fifth wheel connecting means generally indicated by the numeral 3, which comprises a king pin 4 which is carried by the semi-trailer 2 at the forward end thereof and a fifth wheel 5 which is mounted on the rear end of the tractor 1.

The king pin 4 is secured to and extends downwardly from a plate 6 which in turn is secured to the under side of the semi-trailer 2 adjacent the forward end thereof; and the fifth wheel 5 is mounted upon the rear end of the tractor 1 for rocking movement about a transverse horizontal axis by a pair of transversely spaced bearing brackets 7 and 8 which are secured to the underside of the fifth wheel 5 and extend downwardly therefrom, one adjacent each side of the fifth wheel 5. The lower end of the bracket 7 is pivotally connected, by a pivot bolt 9, to and between a pair of bracket arms 10 which are secured to and extend upwardly from a plate 11 which is secured to and between the side frame members 1ª and 1ᵇ of the tractor 1; and the lower end of the bracket 8 is pivotally connected, by a pivot bolt 9ª, to and between a pair of bracket arms 10ª, similar to the bracket arms 10, which are secured to and extend upwardly from the plate 11. The pivot bolts 9 and 9ª, which are disposed in transverse horizontal alignment with each other, are so positioned with respect to the center of gravity of the fifth wheel 5, and the mechanisms carried thereby, that it will gravitate rearwardly and downwardly from the position shown in FIG. 4 to the position shown in FIG. 5 when the tractor is uncoupled from the semi-trailer.

The fifth wheel 5, which is generally circular in form, is provided with a pair of rearwardly extending wings 12 and 12ª which define between them a V-shaped slot 13 which flares rearwardly and outwardly from a central aperture 14.

A suitable locking mechanism, which comprises a hook member 15 having a heel 17 and a nose 18, is provided for engaging and securing the king pin 4 to the fifth wheel 5 as shown in FIG. 2. The hook member 15 is pivotally secured to the under side of the fifth wheel 5 for horizontal back and forth movement by a pivot bolt 16, and is provided with an operating arm 19 which extends out beyond the periphery of the fifth wheel 5 for manual operation. A coiled spring 20 having one end thereof connected to the arm 19 and the other end thereof connected to the fifth wheel 5 normally holds the hook member 15 in king pin releasing position as shown in FIG. 3. As the king pin 4 enters the slot 13 in the fifth wheel during the rearward movement of the tractor for coupling it to the semi-trailer 2, as shown in FIG. 3, it engages the heel 17 and swings the hook member 15 about the pivot bolt 16 into king pin locking position is shown in FIG. 2.

Latching means are provided for releasably maintaining the hook member 15 in king pin locking position. To this end the hook member 15 is provided with an arm 21 having an arcuate edge 22, which is struck on a radius about the axis of the pivot bolt 16, and is provided with a notch 23 in the outer end thereof. A bolt 25, which is slidably mounted in a casing 28 secured to the under side of the fifth wheel, is yielding biased outwardly from the inner end of the casing 28 into engagement with the arcuate edge 22 of the arm 21 by a spring 29 which is disposed in the casing 28 about a rod 26 which is connected to the inner end of the latching bolt 25 and extends outward from the casing 28 through the outer end thereof, and is provided with a handle 27. When the parts are in uncoupled relation, as shown in FIG. 3, the latching bolt 25 is spring pressed outwardly from the casing 28 into engagement with the arcuate edge 22. When the king pin 4 swings the hook member 15 from the unlocked position shown in FIG. 3 to the locked position shown in FIG. 2 the latching bolt 25 is urged into the notch 23 by the spring 29 thereby latching the hook member 15 in king pin locking position. To release the king pin 4 from the fifth wheel 5 the operator withdraws the bolt 25 from the notch 23 against the pressure of the spring 29 by the handle 27. The spring 20 then rotates the hook member 15 from the locked position shown in FIG. 2 back to the unlocked position shown in FIG. 3.

The tractor semi-trailer fifth wheel connecting means just described, to which the safety signal mechanism of the present invention is applied, per se forms no part of the present invention but is an old and well known fifth wheel connecting means for releasably securing a tractor to a semi-trailer, such as shown in U.S. Pat. 1,925,279.

The safety signal mechanism of the invention comprises an electrically actuated signal device, generally indicated by the numeral 30, which is mounted in the cab of the tractor in position to be seen and heard by the tractor operator, and a pair of similar switches 31 and 32 which are secured to the under side of the fifth wheel 5 and are normally yieldingly biased to closed position. The signal device 30 and the switches 31 and 32 are all disposed in an electrical circuit 33 in series with each other. The signal device 30 comprises an audible signal, in the form of an electric buzzer 34, and a visual signal in the form of an electric light bulb 35. The switch 31 comprises a pair of contacts 36 and 37 and a bridging bar 38 which is secured to the inner end of a plunger 39 and is yieldingly spring biased into engagement with the contacts 36 and 37 by a spring 40, and the switch 32 comprises a pair of contacts 41 and 42 and a bridging bar 43 which is secured to the inner end of a plunger 44 and is yieldingly spring biased into engagement with the contacts 41 and 42 by a spring 45. The contact 36 of the switch 31 is connected to the positive side of the tractor battery 46 by a conductor 47, and the contact 37 of the switch 31 is connected to the contact 41 of the switch 32 by a conductor 48. The contact 42 of the switch 32 is connected by a conductor 49 to the buzzer 34 which is connected to the negative side of the battery 46 by a conductor 50 having a switch 51 interposed therein. The light bulb 35 is connected between the conductors 49 and 50 by a jumper conductor 52, whereby both the buzzer 34 and the light bulb 35 are in series with the switches 31 and 32 but not with each other. With this arrangement if either the buzzer 34 or the light bulb 35 get out of order the other thereof will still be operative when energized. Also one or the other of the buzzer 34 and light bulb 35 may be dispensed with, if desired. The switch 51, which is preferably located in the cab of the tractor, is provided to open the circuit 33 and thereby render the safety signal mechanism inoperative when the tractor 1 is not in use.

The switch 31 which is secured to the under side of the wing 12 of the fifth wheel 5 by a bracket 53 extends downwardly therefrom in such a position that the plunger 39 will engage the plate 11 and move the bridging bar 39 up out of engagement with the contacts 36 and 37 against the pressure of the spring 40 when the tractor is uncoupled from the semi-trailer with the fifth wheel 5 in the inclined position shown in FIG. 5; and the switch 32 is secured to the under side of the fifth wheel 5 in position for the arm 19 of the locking mechanism to engage and depress the plunger 44 and move the bridging bar out of engagement with the contacts 41 and 42 against the pressure of the spring 45 when the locking mechanism is in locking position as shown in FIG. 2.

When the tractor is uncoupled from the semi-trailer the switch 31 is maintained open due to engagement of the plunger 39 with the plate 11 and the switch 32 is maintained closed by the spring 45 as shown in FIG. 6. The circuit to the signal device 30 is therefore broken thereby de-energizing the signal device 30. As the tractor 1 is backed up under the semi-trailer the fifth wheel 5 is moved from the inclined position shown in FIG. 5 to horizontal position as shown in FIGS. 1 and 4 which moves the plunger 39 of the switch 31 up out of engagement with the plate 11 thereby permitting the spring 40 to move the bridging bar 38 down into engagement with the contacts 36 and 37 thereby closing the switch 31, as shown in FIG. 5, which will close the circuit to the signal device 30, since the switch 32 is being maintained closed by the spring 45, and energize the signal device 30 which will then emit both audible and visual signals, thereby informing the tractor operator that the king pin 4 is entering the slot 13 in the fifth wheel 5. The signal device 30 will continue to emit signals until the king pin 4 engages the hook member 15 and moves it into locking position as shown in FIG. 2 with the arm 19 engaging and depressing the plunger 44 of the switch 32 thereby opening the switch 32 which breaks the circuit to and de-energizes the signal device 30, as shown in FIG. 8. The signal device 30, being de-energized, will then cease emitting signals which will inform the tractor operator that the king pin 4 has been properly locked to the fifth wheel 5.

If during transit the locking mechanism becomes unlocked for any reason the spring 20 will move the arm 19 out of engagement with the plunger 44 of the switch 32 thereby allowing the spring 45 to close the switch 32, as shown in FIG. 7, which will close the circuit to and re-energize the signal device 30. The signal device 30 being thereby energized will emit signals which will warn the tractor operator that the tractor and semi-trailer are coming uncoupled in time for him to stop the tractor before it drops the semi-trailer.

From the foregoing it will be apparent to those skilled in this art that I have provided a very simple and efficient mechanism for accomplishing the objects of the invention.

It is to be understood that I am not limited to the specific construction shown and described herein as various modifications may be made therein within the spirit of the invention and the scope of the appended claims.

I claim:

1. A safety signal mechanism for a tractor semi-trailer combination which are detachably connected together by a fifth wheel structure in which a king pin carried by the semi-trailer is releasably secured in a slot in a fifth wheel tiltably mounted on the tractor by a locking device carried by the fifth wheel, said safety signal mechanism comprising; an electrically actuated signalling device which is mounted in the cab of said tractor; a pair of similar switches which are yieldingly biased to closed position, one of said switches being secured to the under side of said fifth wheel in position to be maintained open by the engagement thereof with the frame of said tractor when said fifth wheel is inclined rearwardly and downwardly when said tractor is detached from said semi-trailer, and the other of said switches being secured to the under side of said fifth wheel in position to be engaged by and maintained open by said locking device when said locking device is in king pin securing position; and an electric circuit in which said signalling device and said pair of switches are disposed in series with each other; said signalling device being operative to indicate that said king pin has been locked in said slot when said tractor is being coupled to said semi-trailer, and to emit a warning signal if said locking device moves out of engagement with the said other of said switches during transit.

2. A safety signal mechanism as defined by claim 1 in which said signalling device is operative when energized to emit a visual signal.

3. A safety signal mechanism as defined by claim 1 in which said signalling device is operative when energized to emit an audible signal.

4. A safety signal mechanism as defined by claim 1 in which said signalling device is operative when energized to emit a visual and an audible signal.

References Cited

UNITED STATES PATENTS

| 2,387,625 | 10/1945 | Walther et al. | 340—52 |
| 2,454,626 | 11/1948 | Borzell | 340—52 |
| 2,564,520 | 8/1951 | Blasdell | 340—275 |

THOMAS B. HABECKER, Primary Examiner

H. S. COHEN, Assistant Examiner

U.S. Cl. X.R.

180—82; 280—432, 434; 340—275